United States Patent [19]
Lane, Jr.

[11] 3,965,234
[45] June 22, 1976

[54] METHOD OF MAKING RADAR REFLECTIVE BUOY

[76] Inventor: Noel W. Lane, Jr., 2106 Windmill View Road, El Cajon, Calif. 95020

[22] Filed: Oct. 3, 1973

[21] Appl. No.: 403,175

Related U.S. Application Data

[62] Division of Ser. No. 328,659, Feb. 1, 1973, Pat. No. 3,806,927.

[52] U.S. Cl. .................................. 264/275; 43/4.5; 264/278; 264/310; 264/311; 116/19
[51] Int. Cl.² .......................................... B29B 3/00
[58] Field of Search ........... 264/310, 311, 275, 278; 453/18 C; 43/4.5

[56] References Cited
UNITED STATES PATENTS

| | | | |
|---|---|---|---|
| 2,888,675 | 8/1963 | Pratt et al. | 343/18 |
| 3,020,669 | 2/1962 | Beyer-Olsen et al. | 264/310 |
| 3,081,493 | 3/1963 | Beyer-Olsen et al. | 264/310 |
| 3,151,196 | 9/1964 | Tipton | 264/302 |
| 3,344,468 | 10/1967 | Moslo | 264/275 |
| 3,507,950 | 4/1970 | Barnett et al. | 264/310 |
| 3,634,578 | 1/1972 | Suzuki | 264/275 |
| 3,788,792 | 1/1974 | Suzuki | 264/310 |

FOREIGN PATENTS OR APPLICATIONS

| | | | |
|---|---|---|---|
| 1,186,463 | 4/1970 | United Kingdom | 264/278 |

*Primary Examiner*—Eugene C. Rzucidlo
*Attorney, Agent, or Firm*—Herbert E. Kidder

[57] ABSTRACT

A method of making a seamless, hollow, spherical fishing buoy of thermoset resin, preferably cross-linkable polyolefin, by rotationally molding the same without vent holes or openings in the buoy. A 3-plane, rigid, corner cube radar reflector is mounted inside the spherical buoy, and is oriented to provide maximum return of a radar signal from anywhere on or above the horizon. The reflector is centered within the mold cavity by six spring-loaded standoffs, which are attached to the corners of the reflector. The standoffs are molded of the same resin as the buoy, but are only partially cross-linked. During molding cycle, the cross-linkable resin molding powder melts and spreads uniformly over the inside surface of the mold, at the same time cross-linking. The ends of the partially cross-linked standoffs in contact with the hot mold melt and become part of the plastic shell, and also continue cross-linking with the latter. The springs allow the standoffs to follow the mold as the latter expands and contracts, while keeping the reflector accurately centered in the cavity.

3 Claims, 11 Drawing Figures

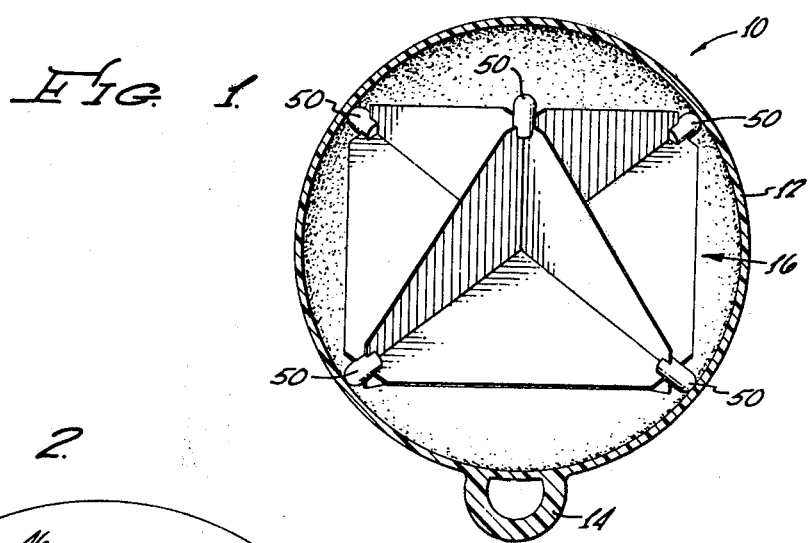
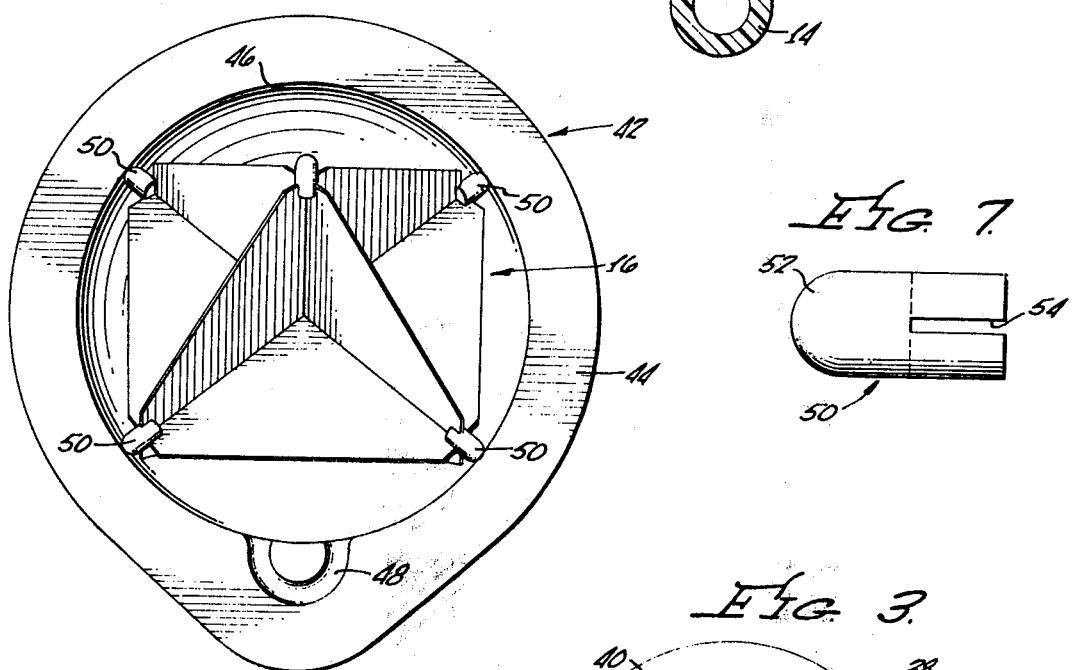
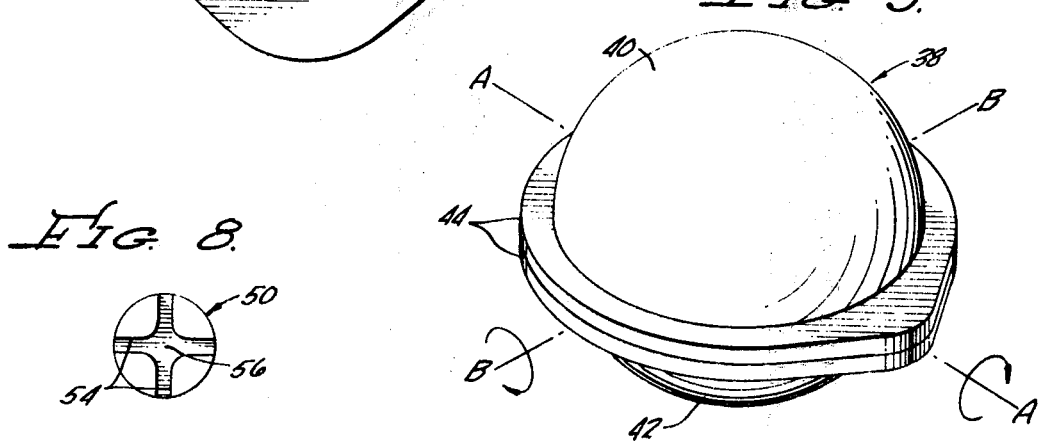
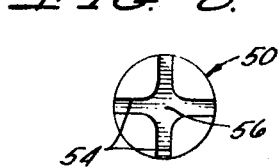

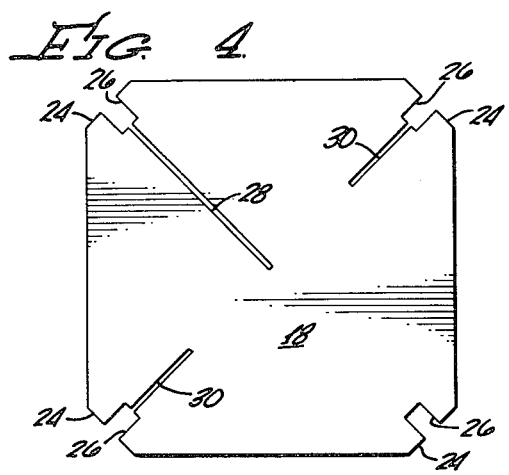
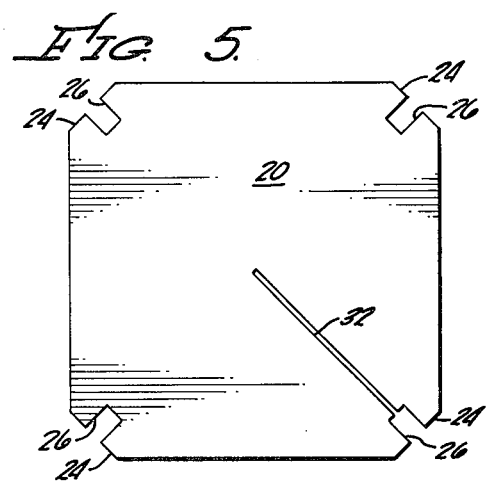
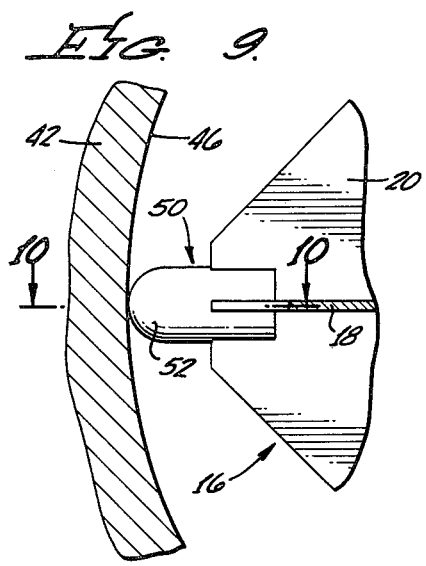
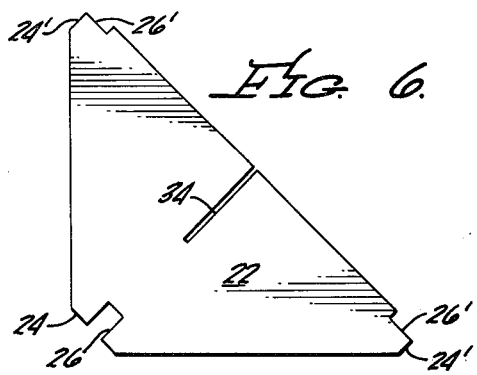
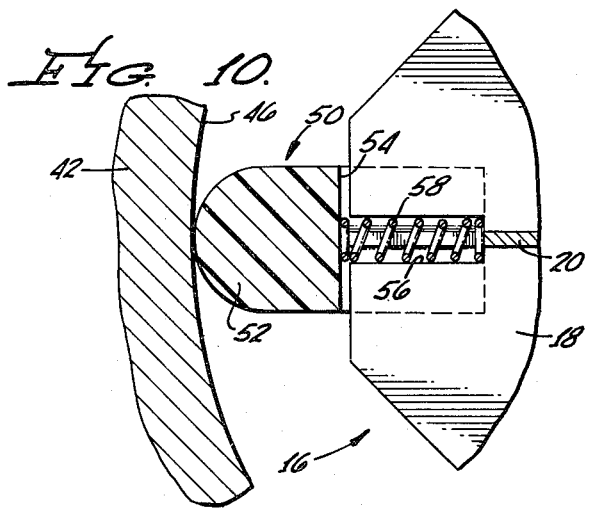
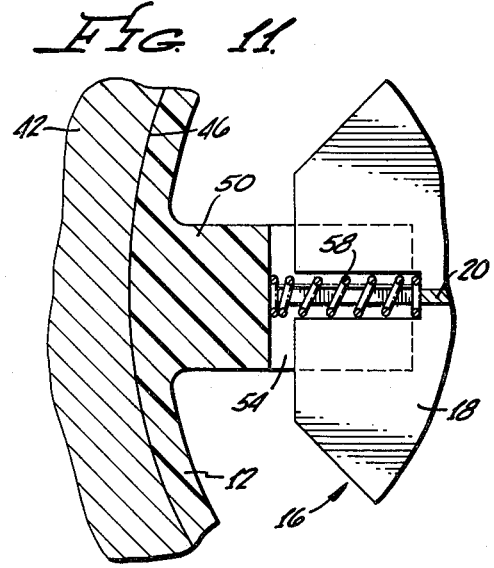

METHOD OF MAKING RADAR REFLECTIVE BUOY

REFERENCE TO RELATED APPLICATIONS

This application is a division of my pending application, Ser. No. 328,659, filed Feb. 1, 1973, now U.S. Pat. No. 3,806,927, issued Apr. 23, 1974.

BACKGROUND OF THE INVENTION

This invention pertains to a method of making molded hollow plastic bodies, having internal structures, such as radar reflectors, enclosed within a continuous envelope of plastic, and in which the finished article has no seams or vent holes to weaken it. The radar reflector marker buoy shown and described in my pending application Ser. No. 328,659, is typical of the type of molded article which might be made by the method of the present invention. Other devices such as navigational aids, and search-and-rescue aids might also be made by the present method.

The commercial fising industry has long used flotation devices to support fishing gear and to locate pots in crab and lobster fishing. Also, gill net fishing is conducted in navigable waters, and a method is required to prevent ships from running over the nets. One of the problems encountered by fishermen is that of locating the marker buoys when they return to the fishing nets or crab and lobster pots. Since most commercial fishing boats and larger ships are equipped with radar, it has become common practice to use radar reflectors inside the fishing buoys, which allow the radar to locate the buoys by the blip prodiced on the radarscope by the reflected echo. Heretofore, such radar reflectors have been enclosed within hollow spherical buoys by forming the buoys in two halves and then welding the halves together after placing the reflector inside the sphere. The only trouble with buoys made in this way is that the seam forms a line of weakness, which often causes failure of the plastic at that point when the buoy is pulled far underwater by tidal surges.

Another disadvantage of the prior radar-reflector buoys is that the size of the spherical fishing buoy limits the size of the radar reflector, with the result that the radar return is relatively weak. Anything that further weakens the signal may reduce the blip on the radarscope to the point where it is indiscernible. The radar reflector most commonly used at this time is a 3-plane, rigid corner cube, made of 3 mutually perpendicular panels of flat sheet aluminum, which define a cluster of eight outwardly facing tetrahedrons. If the reflector is partially submerged in water, or if it is tilted in certain ways, the radar return is minimized, and a weak blip results.

In addition to its application to fishing buoys, the invention also pertains to navigation aids, particularly in connection with low-maintenance, reliable radar reflecting units. Such radar reflecting floats, when used by the boating public, would provide an effective means for locating boats that are lost, stranded, or in distress, by rescue searchers operating from sea or air.

SUMMARY OF THE INVENTION

The primary object of the present invention is to provide a new and unique method of making hollow, spherical articles of the class described, with a rigid structural body enclosed therein, in which the outer shell of the buoy is molded in one piece, without seams or vent holes.

A more specific object of the invention is to provide a method of making hollow, spherical fishing buoys of the type shown and described in application Ser. No. 328,659, wherein a 3-plane, rigid corner cube radar reflector is enclosed within a molded, one-piece plastic shell having no seams or vent holes.

These and other objects and advantages of the invention will become apparent to those skilled in the art from the following detailed description of the preferred embodiment thereof, with reference to the accompanying drawings.

BRIEF DESCRIPTION OF THE DRAWINGS

FIG. 1 is a sectional view of a hollow, spherical buoy embodying the invention, and showing the radar reflector contained within the hollow sphere and oriented in such a way as to provide maximum radar return;

FIG. 2 is an elevational view of one-half of a rotational mold, showing the reflector placed within the mold cavity, prior to closing the mold;

FIG. 3 is a schematic drawing, showing a rotational mold for producing the spherical buoy of FIG. 1, and the manner in which it is rotated about two axes during the molding operation;

FIGS. 4, 5 and 6 are elevational views of the three different plates that are used in mixing the radar reflector;

FIG. 7 is a side elevational view of one of the standoffs;

FIG. 8 is an end view of the same;

FIG. 9 is a partially cut away, fragmentary view showing one corner of the reflector, and the manner in which the standoff engages the inner surface of the mold cavity;

FIG. 10 is an enlarged sectional view, taken at 10—10 in FIG. 9; and

FIG. 11 is a sectional view, showing the standoff fused into the plastic shell of the spherical buoy upon completion of the molding operation.

DESCRIPTION OF THE PREFERRED EMBODIMENT

In the drawings, the reference numeral 10 designates a marker buoy embodying the invention. The buoy 10 comprises a spherical plastic shell 12, molded in one piece without seams or vent holes, and having an attachment eye 14 at the bottom of the sphere, to which the mooring line is attached. The buoy 10 is preferably about 16 inches in diameter, but may be made larger or smaller, according to the need. Enclosed within the spherical shell 12 is a 3-plane, rigid, corner-cube radar reflector 16, which is oriented as shown in FIG. 1 to provide maximum radar return, as will be explained later.

The radar reflector 16 is made up of four flat, sheet aluminum plates, two of which (18 and 20) are generally square, and two (22) are generally triangular. Each of the plates 18, 20 and 22 has its corner cut off square at 24, and cut down into the squared-off corners are notches 26. Extending down from the bottom of the upper left-hand notch 18 (FIG. 4) to the center of the panel, is a narrow slot 28. Other narrow slots 30 extend from the bottom of the notches 26 at the lower left-hand corner and upper right-hand corner to points halfway toward the center of the panel. Panel 20 has only a single slot 32, extending from the bottom of one of the notches 26 at the lower right-hand corner (FIG. 5) to the center of the panel. Both of the triangular panels 22 have notches 34 extending perpendicularly from the hypotenuse edge 36 of the triangular panel to a point approximately halfway out to the bottom of the notch 26. At the ends of the edge 36 are half notches 36', which join at their outer edges with cut-off corner portions 24'.

Panels 18 and 20 are assembled by sliding the two panels together so that the slot 28 receives panel 20 and slot 32 receives panel 18. The panels 18 and 20, when thus assembled, are perpendicular to one another, and their diagonally opposite corners are square with one another. Next, the triangular panels 22 are assembled on opposite corners of panel 18, by sliding them together so that slot 34 receives panel 18, and slots 30 receive panels 22. The finally assembled radar reflector has the configuration shown in FIG. 1, except for the standoffs at the six corners, which will be described presently.

Marker buoy 10 is made in a rotational mold 38, consisting of an upper half 40 and lower half 42, having matching edge flanges 44, which are secured together during the molding cycle. The mold halves 40 and 42 are preferably made of cast aluminum, and are formed with an internal, spherical cavity 46, and a small semicircular cavity 48 on one side to form the eye 14.

Prior to the molding cycle, the mold halves 40 and 42 are separated, and the assembled radar reflector 16 is placed in the lower mold half 42, as shown in FIG. 2, with molded plastic standoffs 50 mounted on each of the six corners of the reflector. Both the plastic shell 12 and standoffs 50 are preferably molded of cross-linkable polyolefin, of which cross-linkable polyethylene is the preferred resin. Cross-linkable polyethylene is conventional polyethylene, with which a catalyst has been compounded that causes cross-linking of the resin to take place when the resin is heated to a temperature of between 350° and 400° Fahrenheit.

Standoffs 50 are generally cylindrical in configuration, with a rounded nose 52 at one end, and crossed slits 54 formed in the opposite end thereof. At their intersection, slits 54 form a slightly enlarged, central cavity 56 to receive a helically coiled compression spring 58, as seen in FIGS. 10 and 11.

The standoffs 50 are molded by loading a transfer mold with molding powder, heating the mold up to about 350°F, after which the mold is closed and the charge compressed. The mold temperature is then raised to about 400°F for about 10 minutes. The finished product is rigid, but not fully cross-linked, and will still melt at a temperature of about 350°F.

Standoffs 50, with springs 58 assembled in cavities 56, are placed on the six corners of the radar reflector, with slits 54 extending down over the adjacent sheet metal panels. The sheet metal panels 18, 20 and 22 define a cluster of tetrahedrons, each having triangular sides, and the outer face of each tetrahedron being open, as shown in FIG. 1.

The radar reflector 16 is carefully assembled in the lower mold half 42, with one tetrahedron facing directly down toward the handle cavity 48. As a result, the finished buoy has its reflector oriented with one tetrahedron pointing directly downward when the buoy is floating in the water, and since the water level extends up to only about the bottom edge of the reflector, this places seven of the eight tetrahedrons above the water's surface. This insures that the maximum area of the reflector will be exposed to the microwaves on or above the waterline, and provide maximum radar return from any direction.

The molding operation is essentially the same as that shown and described in my pending application, Ser. No. 321,758, filed Jan. 8, 1973. A measured quantity of thermoplastic or fusible resin powder or pellets, preferably cross-linkable polyethylene, is placed inside the cavity 46 of the mold 38. The mold is then closed and rotated simultaneously about the two axes A—A and B—B, while being heated up to the fusion, or melting temperature of the resin. As the mold temperature reaches about 260°F, the powdered or pelleted resin begins to melt and spread uniformly over the entire inside surface of the mold cavity, forming a continuous, uninterrupted shell of melted plastic. Cross-linking starts almost immediately as the resin melts, and continues throughout the molding process, being virtually completed by the time the mold temperature reaches 460°F. At the same time, the rounded noses 52 of the standoffs, which are pressed by springs 58 against the inner surface 46 of the mold, begin to soften and melt, and the standoffs are held by spring pressure against the mold surface with more-or-less constant pressure, so that as the rounded nose melts, it moves outwardly to retain its contact with the mold surface. As the end of the standoff melts, it continues its cross-linking process, and at the same time merges with the hot, fused plastic shell 12, so that the shell and standoff continue to cross-link as one. After about 15 minutes at 470°F, the polyethylene is completely cross-linked, and is no longer a thermoplastic.

Upon completion of the molding cycle, the mold 38 is rapidly chilled to set the plastic and prevent it from collapsing due to the partial vacuum pressure which develops on the inside of the sphere as the trapped air cools. The finished part is removed from the mold and is ready for use.

The radar reflector buoy made by the method of the present invention provides a strong radar return from any point on or above the horizon, due to two important factors: (1) the plates 18, 20 and 22 have been designed to produce the maximum reflective area for a radar reflector contained within a 16-inch diameter sphere; and (2) the orientation of the reflector 16 within the sphere is such that practically all of the reflector will be above the surface of the water, with seven of its eight reflectivve tetrahedrons facing radially outward toward the horizon or upwardly. Maximum area of the microwave-reflective plates 18, 20 and 22 is obtained by cuttin off the corners at 24, which allows a square plate of greater width dimension in both directions to be enclosed within a sphere of given diameter. As a result, the maximum area is obtained, while still providing the necessary clearance between the edges of the plates and the inner surface of the mold to allow the molding powder to tumble around and become uniformly dispersed within the mold. The amount of microwave energy returned by the reflector is a function of the exposed surface area, and the bigger the area, the more energy is returned.

Another feature that contributes importantly to the effectiveness of the reflector is the orientation of the reflector with one tetrahedron pointing downwardly toward the handle. This places the reflector high in the buoy, with the waterline farthest down on the reflector. Seven of the eight tetrahedrons are above the waterline, facing radially outward toward the horizon or upwardly. This maximizes the chance that a radar signal will be returned from anyplace in the hemisphere above the water level. If oriented in any other way, the reflector may tilt with respect to the radar transmitter, to expose a minimum reflective surface, giving a very small blip on the scope.

While I have shown and described in considerable detail what I believe to be the preferred form of the invention, it will be understood that the invention is not limited to such details, but might take various other forms within the scope of the claims. For example, the method of the invention might be used to produce any seamless, hollow, plastic shell of thermoset resin, having a rigid body, such as a structural framework of reinforcing braces enclosed therein, instead of a radar reflector.

What I claim is:

1. The method of making a seamless and ventless hollow spherical shell of fusible cross-linkable polyolefin, with a rigid radar reflector fixedly molded therein, said radar reflector being formed by 3 mutually perpendicular, flat plates of micro-wave reflective material which define a cluster of 8 tetrahedrons, the intersections of each perpendicular pair of plates forming outer corners, said method comprising the steps of:
   1. placing said radar reflector within a hollow mold cavity, using a plurality of spring-loaded standoffs attached to said corners, each of said standoffs having two perpendicularly related slots at one end thereof to slidably receive the corners of the respective reflector plates, and a cavity at the intersectin of said slots containing a compression spring that bears at one end against the standoff and at the other end against the reflector plates, said standoffs being molded of the same resin as said shell, but which has been only partially cross-linked;
   2. loading a measured quantity of said fusible cross-linkable polyolefin into the mold cavity;
   3. closing said mold, thereby slightly compressing said springs;
   4. rotating said mold while heating the same above the fusion temperature of said resin, causing the resin particles to melt and form a continuous shell inside the mold cavity, and also causing the outer extremities of said standoffs to melt and fuse into said shell to become an integral part thereof, said outer extremities of the standoffs continuing the cross-linkig process as they fuse and merge with the molten plastic shell; and
   5. rapidly chilling the molded part so as to cause the plastic resin to stiffen and become relatively rigid.

2. The method of claim 1, wherein the plastic resin is cross-linkable polyethylene.

3. The method of claim 1, wherein said radar reflector defines eight tetrahedrons, the outer face of each of which is open; said reflector being positioned within the mold cavity in such a position that, in the finished product, the radar reflector is oriented with one of the tetrahedrons facing downwardly and the other seven tetrahedrons facing radially outwardly to the horizon, or upwardly, so as to give maximum radar return to any point above the horizon.

* * * * *